July 1, 1947. P. W. WOODGATE 2,423,430
DIFFERENTIAL LINE-SPACING MECHANISM FOR TYPEWRITERS
Filed April 26, 1945 10 Sheets-Sheet 1
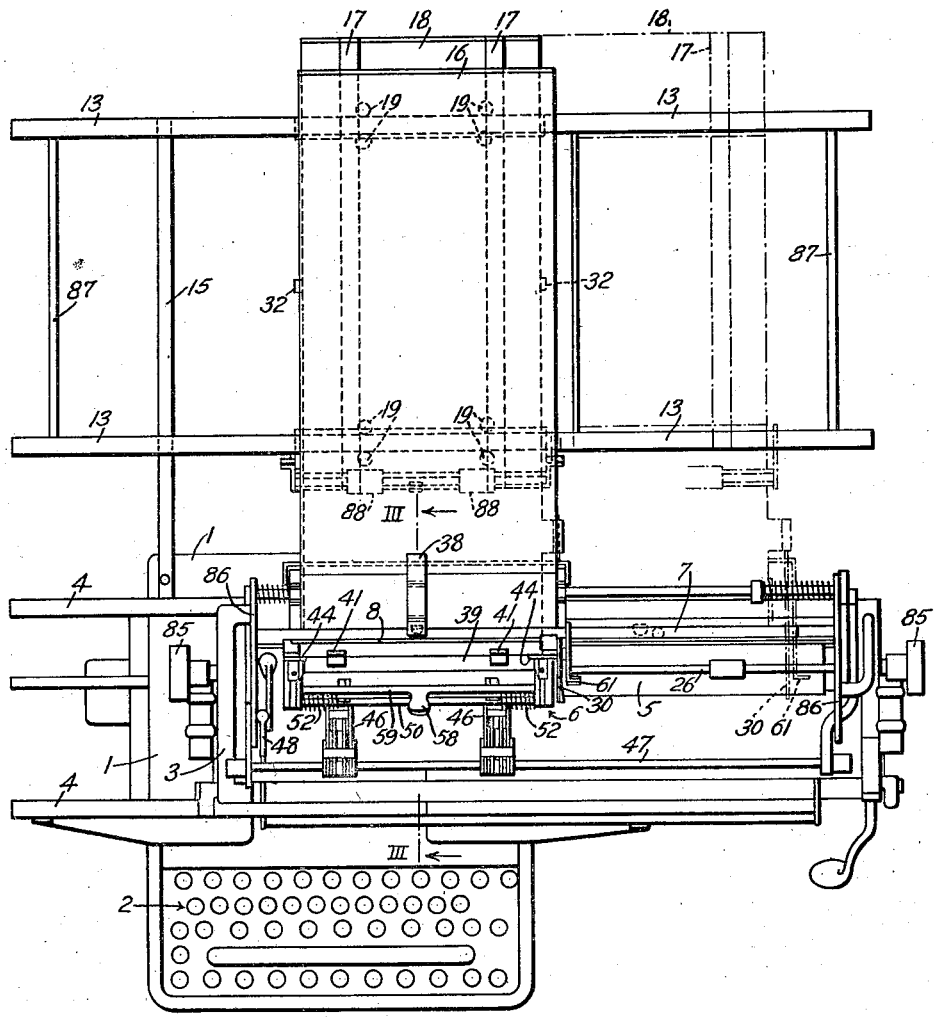
Fig.1
INVENTOR
PERCY WILLIAM WOODGATE
BY 
ATTORNEY July 1, 1947.  P. W. WOODGATE  2,423,430
DIFFERENTIAL LINE-SPACING MECHANISM FOR TYPEWRITERS
Filed April 26, 1945    10 Sheets-Sheet 6
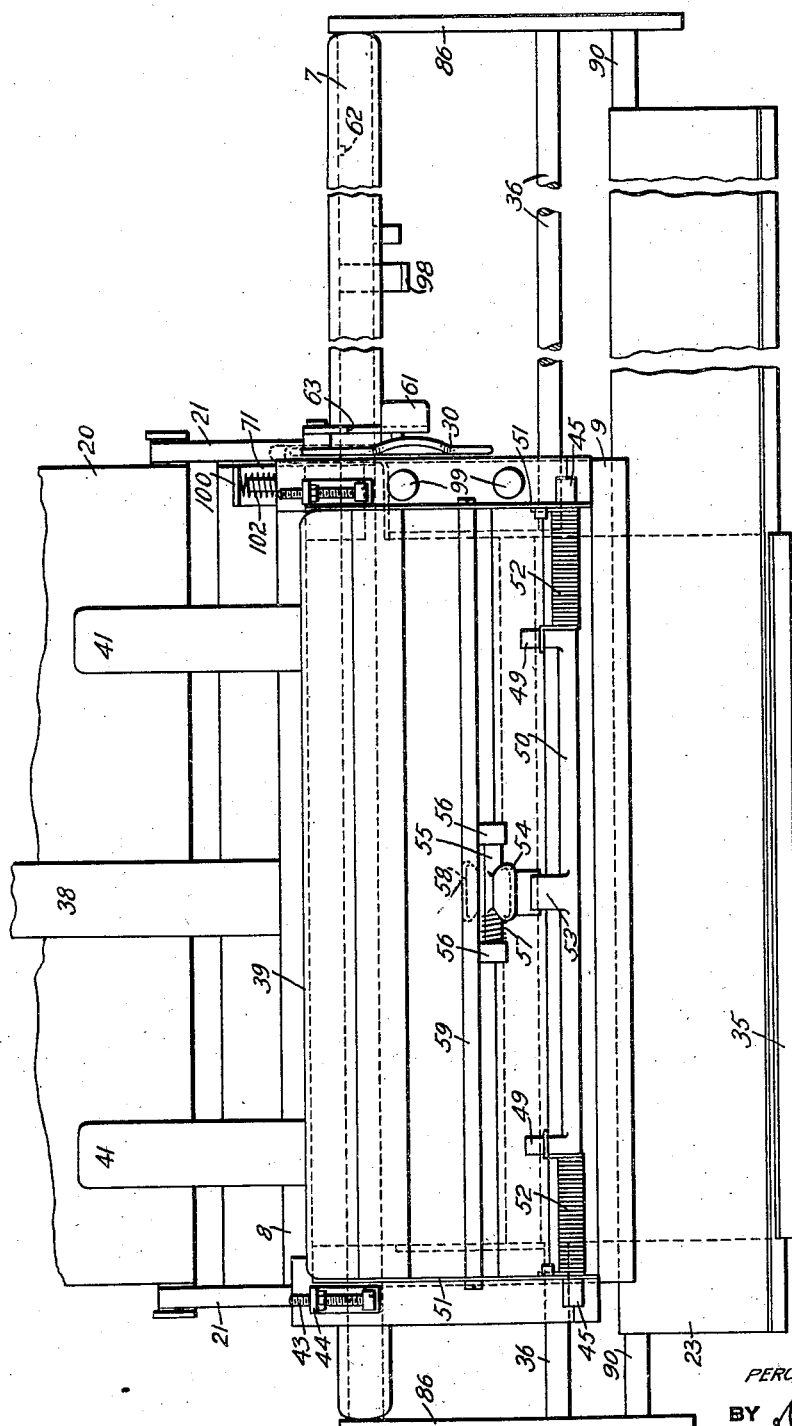
Fig. 6
INVENTOR
PERCY WILLIAM WOODGATE
BY 
ATTORNEY

Fig. 7

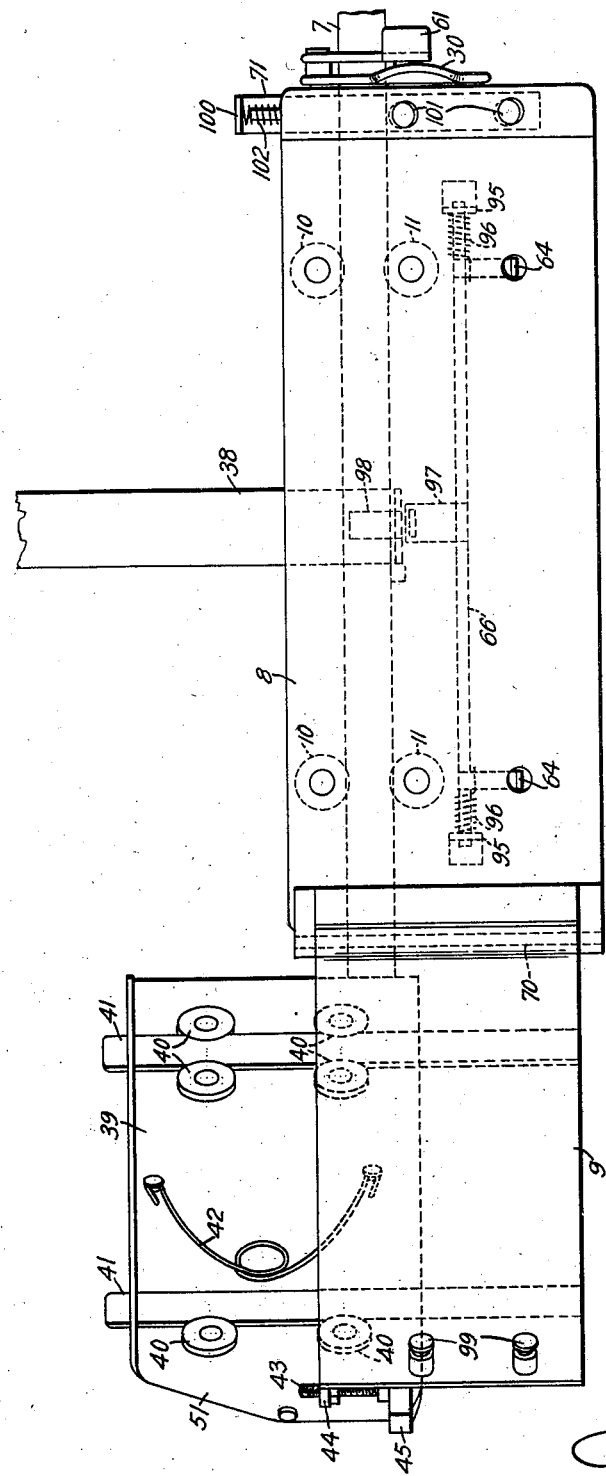

July 1, 1947. P. W. WOODGATE 2,423,430
DIFFERENTIAL LINE-SPACING MECHANISM FOR TYPEWRITERS
Filed April 26, 1945 10 Sheets-Sheet 9
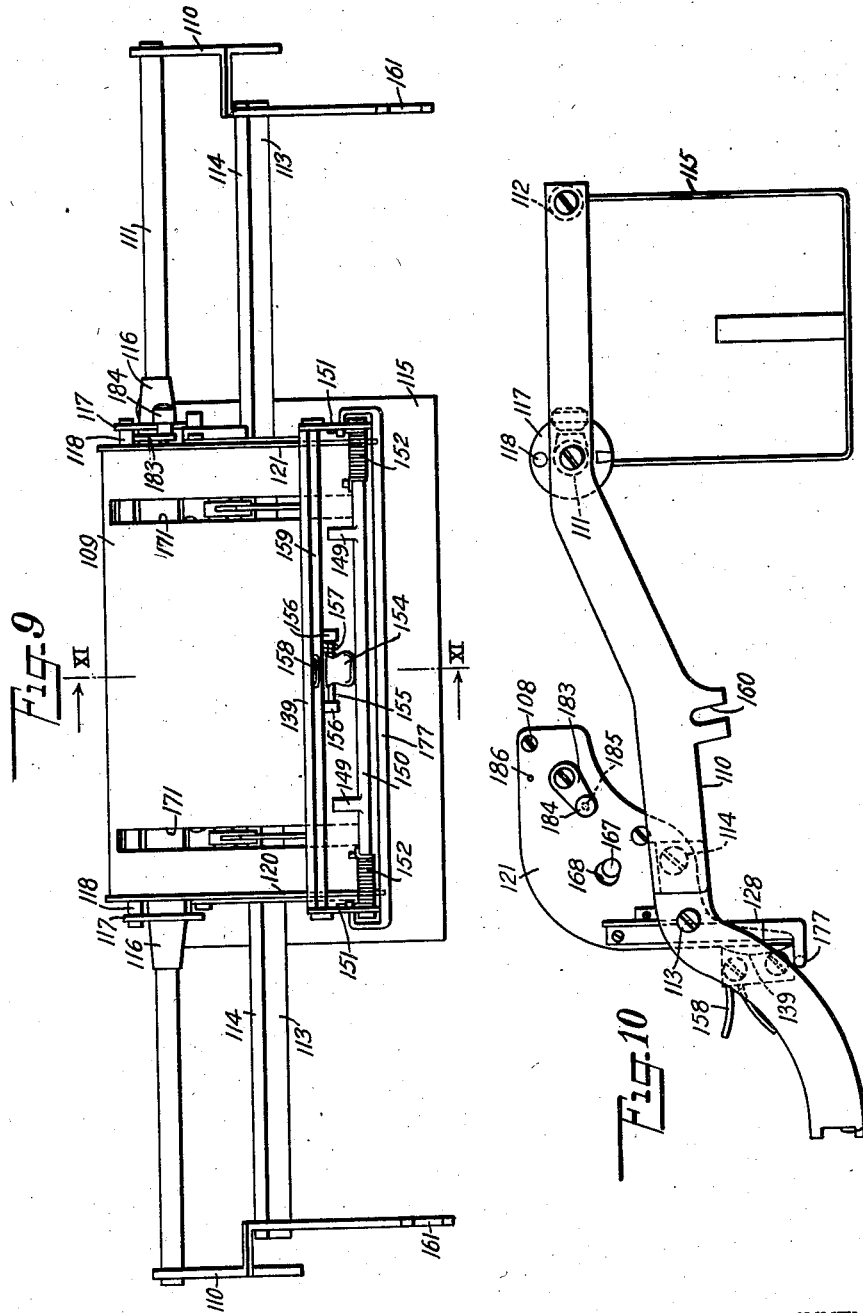
INVENTOR
PERCY WILLIAM WOODGATE
BY
ATTORNEY July 1, 1947. P. W. WOODGATE 2,423,430
DIFFERENTIAL LINE-SPACING MECHANISM FOR TYPEWRITERS
Filed April 26, 1945 10 Sheets-Sheet 10
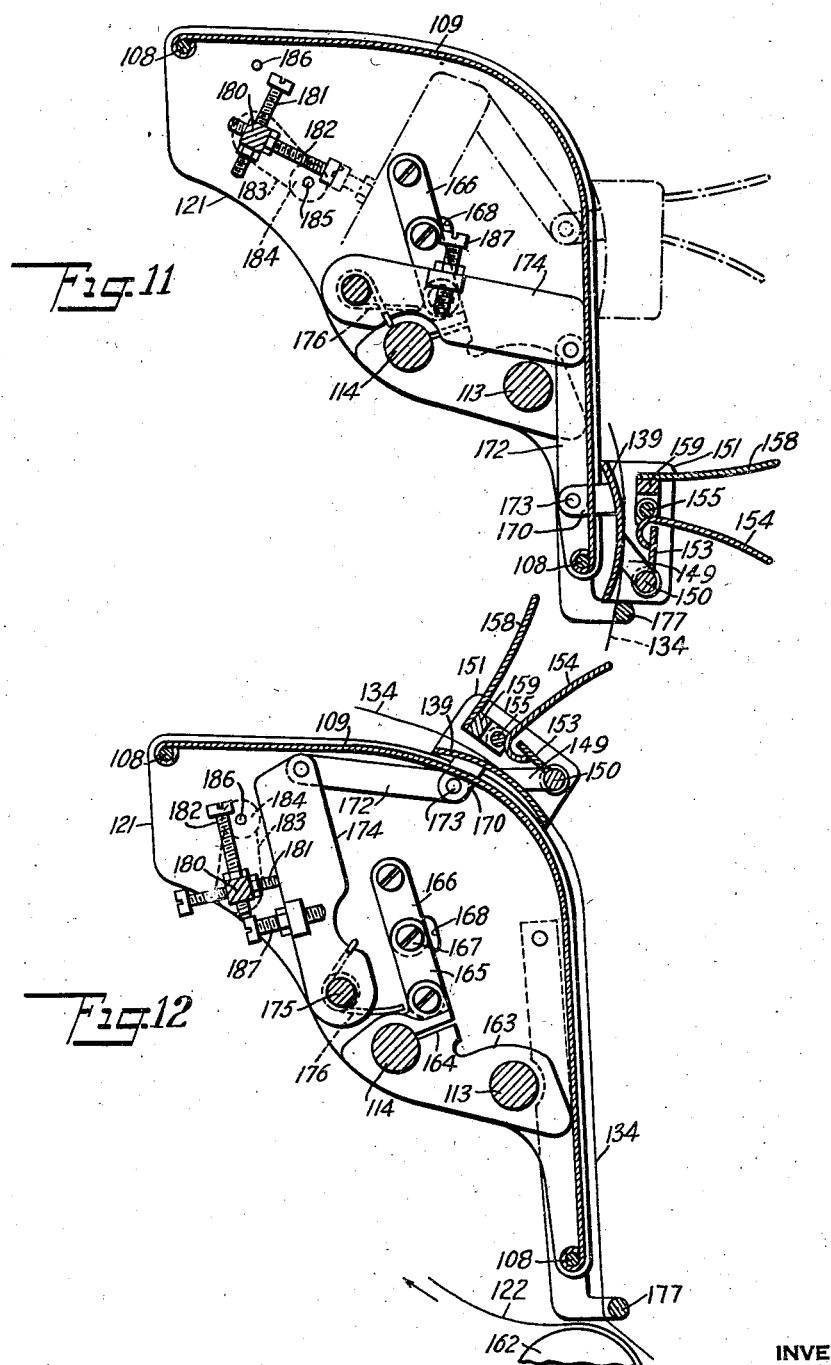
INVENTOR
PERCY WILLIAM WOODGATE
BY
ATTORNEY Patented July 1, 1947

2,423,430

UNITED STATES PATENT OFFICE 2,423,430

DIFFERENTIAL LINE-SPACING MECHANISM FOR TYPEWRITERS

Percy William Woodgate, London, England, assignor to Remington Rand Inc., Buffalo, N. Y., a corporation of Delaware Application April 26, 1945, Serial No. 590,461
In Great Britain April 27, 1944

11 Claims. (Cl. 197—128)

This invention relates to typewriters or like machines, e. g., accounting machines, calculating machines, book-keeping machines, teleprinters and so forth, by means of which original and duplicate copies of written matter may be made on paper or like sheets. The term "sheet" is used in this specification to include both a single piece of paper or card of any desired length and width and a pack of such pieces backed with carbon or interleaved with carbon paper.

It is sometimes desired to print certain matter on one sheet and simultaneously a selection only of such matter on one or more further sheets. As an example, in typing on one or more sheets a series of advice notes indicating the quantities of various items despatched and their destinations it may be desired to reproduce only the details of the items and not the distinations on one or more other sheets. In existing machines it is not easy to bring a second sheet or set of sheets into position only when required.

An object of this invention is to provide means for bringing a second sheet or set of sheets into position as required without disturbing the first sheet or sheets.

A further object of the invention is to provide in a typewriter or other machine having a travelling carriage with which one or more sheets travel during the typing operation a further carriage for a second sheet or sheets, this further carriage being mounted to move laterally between an inoperative position and one or more operative positions in which the second sheet or sheets is or are superimposed on the first.

It is sometimes also desired that the line spacing on two or more sheets which are being typed simultaneously should be different. For instance in typing such a series of advice notes as that described above it may be desired to keep a closely spaced record of all the items on one sheet, whereas much wider spacing may be required on another, e. g., because it may later be divided, but neither of these sheets should carry the destinations of the items.

Another object of this invention is to provide on the second carriage a mechanism by which the line spacing may be effected differentially without removing the sheets from the machine.

In existing differential line-spacing mechanisms the front sheet in the machine is passed between two rods carried in a rocking frame attached to the top of the machine, and finger grips are provided by which clamps on one rod can be urged into contact with the sheet to clamp it against the other rod. To move the front sheet through a greater distance than those behind it, the finger grips are pressed together so that the sheet is clamped in the frame and the frame is rocked through a predetermined angle which depends upon the spacing desired between the lines on the front sheet. The back sheet or sheets are not moved with the front sheet on this rocking. The finger grips are then released and the frame is rocked backwards or falls back under the action of gravity. The extent of the upward movement is determined by the setting of the device, that is to say, by the angle through which the frame can be rocked before it reaches a stop. This can be varied, but once it has been set it is not possible to type differing numbers of lines on successive parts of the front sheet and still to ensure that each first line will be typed at the desired point. As an example, if the front sheet consists of a series of perforated checks or advice notes, the mechanism should serve to bring a specific part of each fresh check or advice note into position at each movement and it will do this satisfactorily if each check or advice note has only a single line or a constant number of lines, typed on it. If, however, the mechanism is set for one-line checks it is not possible to type two lines on one or more of the checks without altering the setting of the differential line-spacing mechanism.

Yet another object is to provide a mechanism which is free from the limitation just described.

With existing mechanisms the operator may easily tear the front sheet by rocking the frame very sharply.

A still further object is to eliminate this risk or to reduce it to a minimum.

The invention will be most readily understood by reference to the accompanying drawings, in which:

Figure 1 is a plan of a book-keeping typewriter having a differential line-spacing mechanism attached to it;

Figure 6 is a front elevation of the differential line-spacing mechanism and its support;

Figure 7 is an elevation taken from the right of Figure 6;

Figure 8 shows the support for the differential line-spacing mechanism opened up to receive a back sheet;

Figure 9 is a front elevation of a modified form of differential line-spacing mechanism for attachment to a typewriter;

Figure 10 is a side view of the mechanism shown in Figure 9;

Figure 11 is a section on the line XI—XI in Figure 9; and

Figure 12 is a section similar to Figure 11 with the parts in a different operating position.

Figure 7:
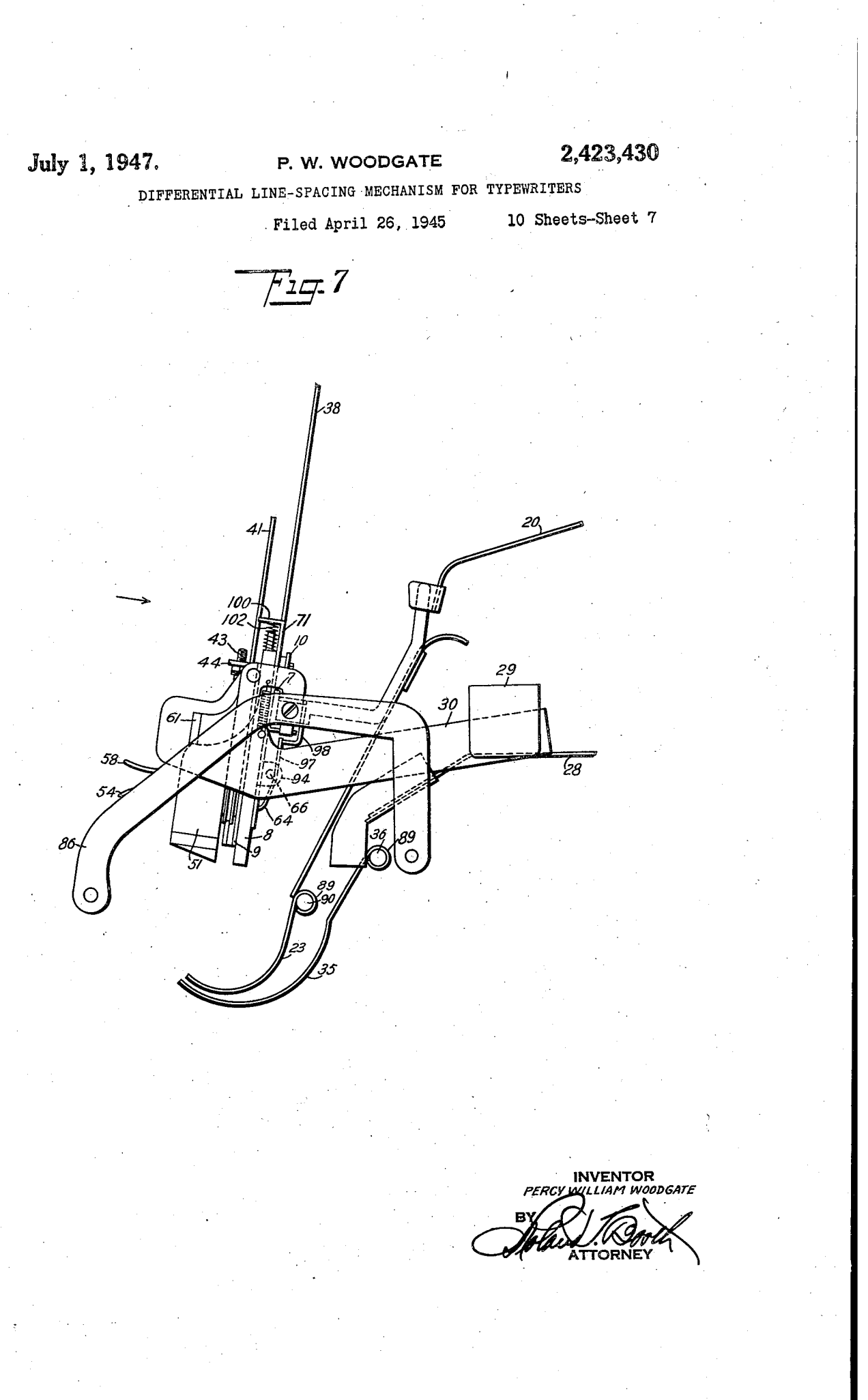
Figure 2:
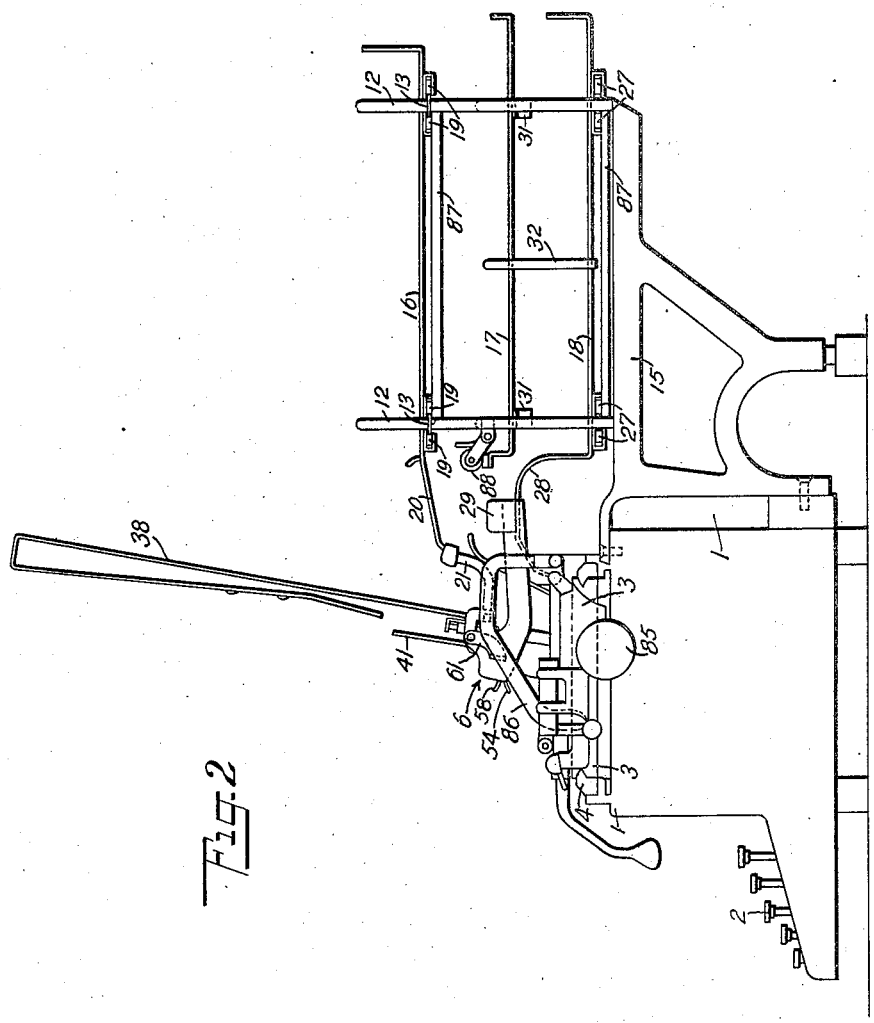
Figure 2 is a side elevation of it.

The machine shown includes a main frame 1 with a keyboard 2. A typewriter carriage 3 of standard front-feed construction and arranged to be lifted from lower to upper case is mounted to slide on rails 4 in the usual manner and carries a platen roller 5 which can be turned by either of two handles 85. A second carriage 6, shown in detail in Figures 6 and 7, is mounted to travel along a rail 7 which is parallel to the platen roller and secured to the carriage 3 by brackets 86. These brackets, the rail 7 and the carriage 6 together constitute an attachment mounted on the first or standard carriage 3 and co-operating with parts of it.

The carriage 6 comprises two plates 8 and 9, parallel to one another and set at a small angle to the vertical. The back plate 8 carries on its rearward face upper rollers 10 and lower rollers 11 which respectively engage the upper and lower edges of the rail 7, so that the carriage 6 can be moved by hand along the rail 7 as desired.

At the back of the typewriter there is a fixed framework composed of vertical members 12 and horizontal rails 13 and 14 united by transverse bars 87, the whole being mounted on a frame 15 rigid with the main frame 1. Three trays 16, 17 and 18 are mounted to slide laterally along this framework, which with the trays constitutes a further addition to the standard typewriter. The tray 16 carries rollers 19 on its underside and these rollers engage the edges of the rails 13. This tray is connected by a bent plate 20 to two arms 21 rigid with the rail 7, so that the tray travels with the carriage 3. A sheet 22, which is directly carried by the carriage 3, is fed to the platen roller 5 from the tray 16 and passes between the underside of the platen roller and a deflector plate 23 carried by a rod 90 secured in the carriage 3, past the point at which printing takes place, between feed rollers 24 and the platen roller 5, under a bail 26 and then upwardly, all as indicated by a chain line in Figure 3.

The trays 17 and 18 move with the second carriage 6. The tray 18 carries rollers 27 on its underside and these engage and run on the rails 14. A bent plate 28 rigid with the front edge of the tray carries a lateral lug 29 of inverted U-shape, and a bracket 30 which is rigid with and extends rearwardly from the plate 8, thus forming part of the carriage 6, enters the lug 29 from below. This arrangement ensures that the plate 28 must travel laterally with the carriage 6, but it allows the bracket 30 to move vertically when the shift key is depressed to lift the carriage 3 and with it the carriage 6 from the lower to the upper case. The tray 17 is composed of metal strips carried by lugs 31 on uprights 32 which are secured to the sides of the tray 18, so that the two trays move as a unit with the carriage 6. A pivoted bail 88 is provided to bear on sheets passing from the tray 17. When required, further sheets 33 and 34 can be superimposed on the sheet 22 by sliding the carriage 6 relatively to the carriage 3 from an inoperative position, indicated generally in chain lines in Figure 1, to an operative position, shown in full lines in the same figure. In this latter position the trays 17 and 18 are directly beneath the tray 16.

A second deflector plate 35 is provided and is formed with a sleeve 89 slidable on a bar 36 extending between the brackets 86, so that the plate 35 travels laterally with the second carriage 6. This plate 35 lies beneath and is co-axial with the deflector plate 23. It is shorter than the plate 23 and when the carriage is in the inoperative position the plate 35 lies almost entirely to one side of the path traversed by the sheet 22. There is, however, always a little overlap between the plate 35 and the sheet 22, so as to ensure that when the carriage 6 is moved into its operative position the plate will not foul the edge of the sheet.

The plate 9 which forms part of the carriage 6 is hinged to the plate 8 at 70 so that it can be swung forward about a substantially vertical axis into the position shown in Figure 8 to allow the sheet 33 to be introduced between the two plates when the carriage 6 has been brought into the operative position. The sheet 33 passes from the tray 17 between the deflector plates 23 and 35 and then upwards between the plates 8 and 9 into a receiving and guiding strip 38 rigid with the carriage 6. The plate 8 constitutes a support for this sheet above the platen roller.

To secure the plate 9 in position, projections 99 on its rearward face enter openings 101 in the plate 8 and are latched by a latch member 71 which is urged into the latching position by a spring 102. To release the latch, the head 100 of the latch member is pushed downwardly against the spring.

The sheet 34 passes from the tray 18 over the plate 28, then between the sheet 33 and the deflector plate 35 and then upwards in front of the plate 9 to a mechanism for effecting a differential line spacing of the matter printed on it relatively to the two sheets 33 and 22 behind it. It will of course be understood that either the sheets 34 and 33 are carbon-backed or carbon is interleaved with the sheets. Accordingly the sheet or sheets carried directly by the first carriage 3 receive carbon impressions when the carriage 6 is in its operative or printing position. The result is that one piece of paper or the like will carry some original impressions and some carbon impressions.

In the machine shown in Figures 1 to 8 the differential line-spacing mechanism is mounted on the carriage 6 and forms a permanent part of it. This mechanism includes a slide 39 in the form of a plate carrying rollers 40 on its rearward face, these rollers engaging fingers 41 carried by the hinged plate 8. The slide 39 is urged upwards by a bowed spring 42 anchored at one end to the slide and at the other end to the plate 9, so that when allowed it moves upwards, its travel being limited by the engagement of lugs 45 on the slide with set-screws 43, adjustably carried by lugs 44 on the plate 9. The sheet 34 is resiliently clamped against the front face of the slide and is also clamped against the platen 5 by the feed rollers 24. These rollers are mounted in arms 46 and are moved into and out of engagement with the platen roller 5 by levers 91 which in turn are rocked by a shaft 47 mounted in the carriage 3. This shaft is turned about its axis by a lever 48 through toothed wheels 69 so that the feed rollers 24 are pressed hard against the platen 5 or withdrawn from it. These feed rollers and their operating mechanism are part of the standard typewriter, but they cooperate with the attachment shown in Figures 6 and 7 in that the slide 39 is held down against the spring 42 by the fact that it cannot move relatively to the sheet 34 so long as the resilient clamp is in operation and the sheet 34 cannot move upwards so long as it is held by the feed rollers 24 and platen roller 5. If the platen roller is turned by either handle 85 while all the sheets are held by the feed rollers 24, they will all move with the platen roller and the slide 39 will move with them. When the feed rollers 24 are withdrawn by operating the lever 48, the slide will move upwards from whatever position it may occupy until the lugs 45 come into contact with the set screws 43.

Figure 3:
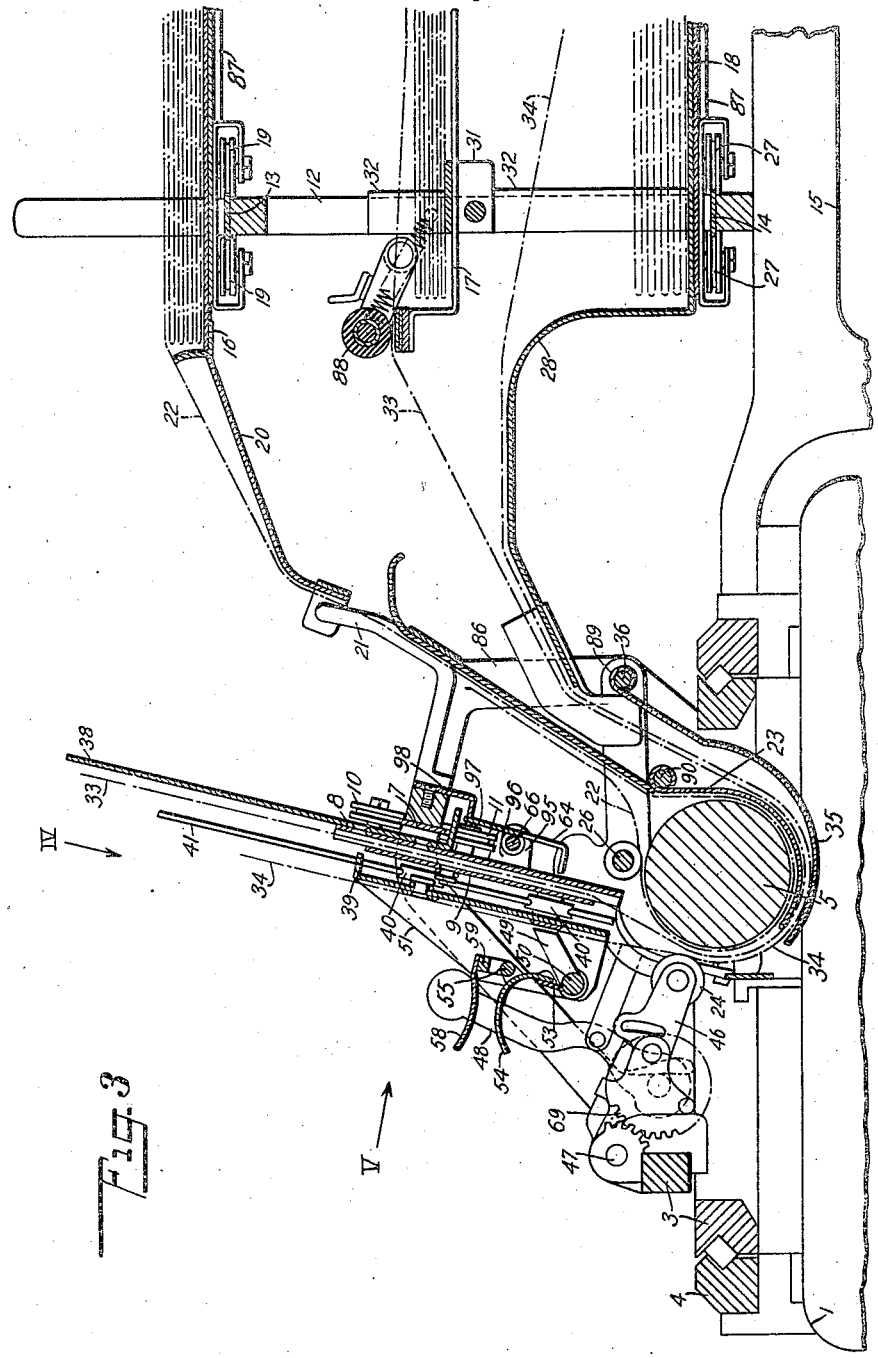
Figure 3 is a section on the line III—III in Figure 1 and is an a larger scale.
Figure 4:
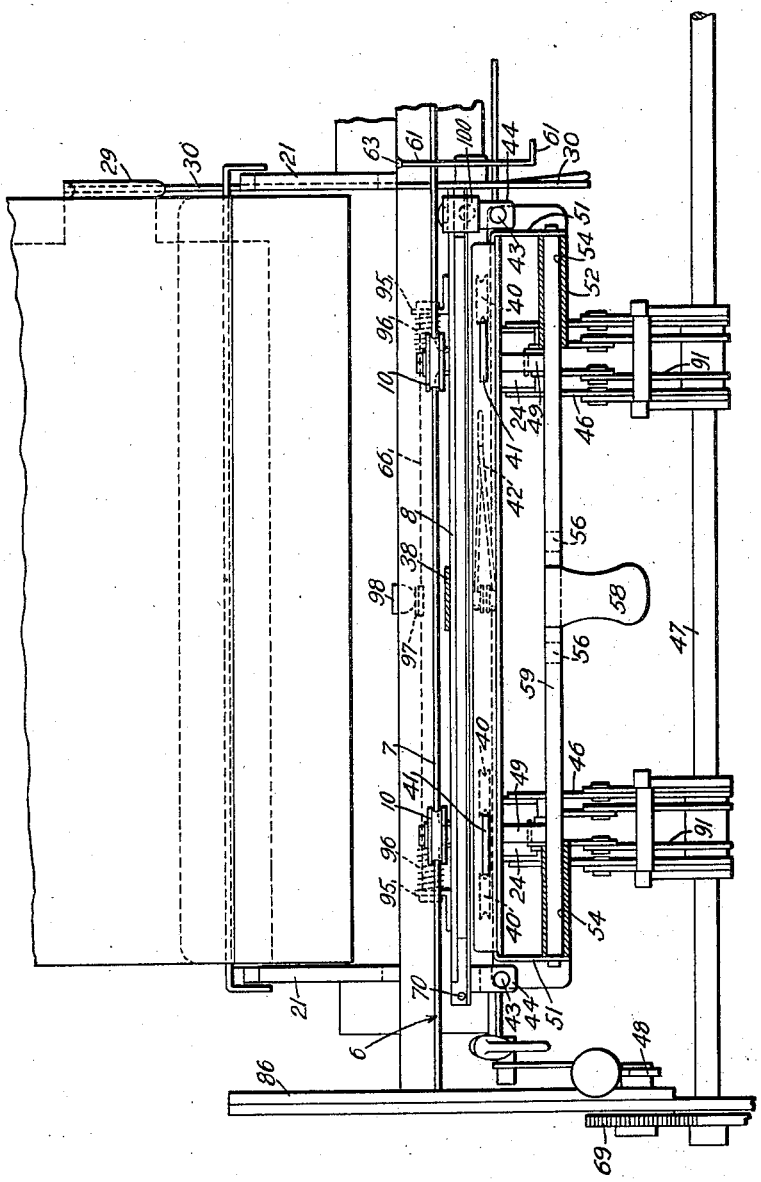
Figures 4 and 5 are views looking in the direction of the arrows IV and V respectively in Figure 3.
Figure 5:
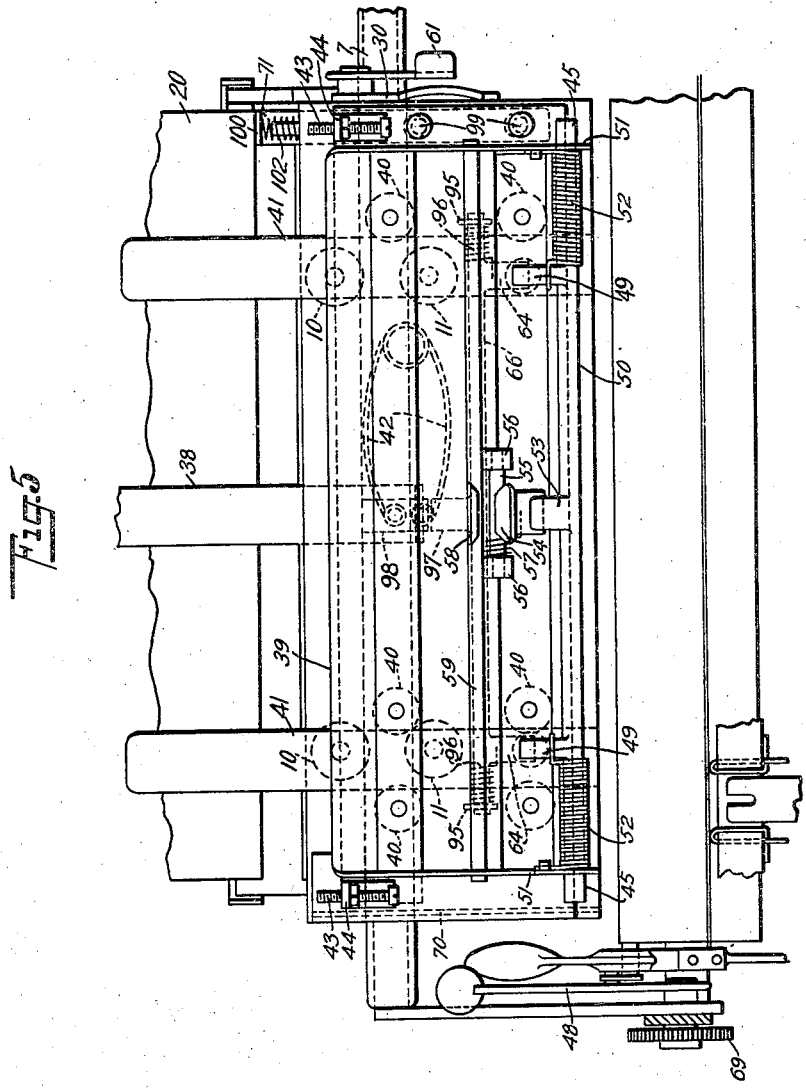

The resilient clamp for the sheet 34 includes projections 49 which extend radially from a spindle 50 carried in brackets 51 fixed to the ends of the slide 39. This spindle 50 is urged to turn about its axis by coil springs 52, and it carries an abutment 53 by means of which it can be rocked against the springs 52. To rock this abutment a finger piece 54 fixed to a rod 55 mounted to rotate about its own axis in openings in brackets 56 against a spring 57 is urged towards a fixed finger piece 58. The finger piece 58 is secured to a rod 59, the ends of which are fixed in the brackets 51 and which also carries the brackets 56 in which the rod 55 is mounted. When the finger piece 54 is moved upwards, its rearward end rocks the abutment 53 anticlockwise as seen in Figure 3, and releases the projections 49 from their clamping engagement with the sheet 34.

The second carriage is locked in its operative and inoperative positions by the engagement of a latch 61 with slots 62 and 63 respectively in the rail 7. This latch is pivoted in the bracket 39 and is rocked into the latching position by a spring.

When the carriage 6 is in either end position, determined by the engagement of the latch 61 in one of the slots 62 and 63, the sheet 33 must be free to move, but when the carriage 6 is moving along the carriage 3 the sheet 33 must be prevented from slipping downwards. For this purpose claws 64 are provided to urge the sheet 33 into frictional engagement with the back of the plate 9 and are moved out of engagement when the carriage 3 is in either end position. These claws are carried by a shaft 66 which is mounted in brackets 95 fixed to the plate 8 and is urged to turn about its own axis by springs 96. In either end position of the carriage 6 a lever 97, rigid with the shaft 66, strikes one or other of two cam surfaces 98 on the rod 7 and so rocks the shaft 66 against the springs 96 and moves the claws 64 out of engagement with the sheet 33.

In operation the typewriter may be used in the normal way for producing an original and as many carbon copies as are required by moving the whole carriage 6 to its inoperative position and rocking the lever 48 to hold the projections 49 out of engagement with the sheet or sheets which are being typed. These sheets may be drawn from the tray 16 or inserted by back feed between the platen 5 and the deflector plate 23. If now it is desired to reproduce some of the typed matter on further sheets, the carriage 6 is slid to the left, as seen in Figure 1, into its operative position, the further sheets 33 and 34 being introduced between the two deflector plates 23 and 35 in the manner described above. If in addition it is desired to make the line spacing on the sheet 34 different from that on the other two sheets, the lever 48 is rocked so that the projections 49 clamp the sheet 34 against the face of the slide 39. At the end of each line the platen roller 5 is turned in the usual way and carries all three sheets with it so that they all move through the line spacing desired for the back sheets 22 and 33. The feed rollers 24 remain in engagement with the sheets during this movement. Next the feed rollers 24 are released by moving the lever 48 and thereupon the slide 39 is moved upwards by the spring 42 and carries the sheet 34 with it through the additional distance desired to provide the extra line spacing. The lever 48 is then again rocked so that all three sheets are once more gripped between the feed rollers 24 and the platen roller 5. Finally the slide 39 is released by engagement of the finger pieces 54 and 58 and moved manually downwards against the spring into its bottom position, the finger pieces being then released so that the projections 49 once more clamp the sheet 34 against the face of the slide.

It will be seen that in principle the differential line-spacing mechanism comprises a clamping device which engages at least the front sheet and is mounted to move upon normal line spacing to maintain the front sheet in tension but upon release of the holding means is permitted to travel into a predetermined line-spacing position, carrying the clamped sheet or sheets with it without moving the remaining sheets. The extent of this movement depends upon the number of normal line-spacing movements (i. e., upon the number of lines typed) between successive releases of the rollers, but in every case the clamp moves into a predetermined position upon such release. Thus within the limits of movement any number of lines may be typed and yet on each final movement of the clamp the next check or other form will be brought into the desired position.

Moreover, the fact that the clamp is moved upwards by the spring ensures that the upward pull will always be the same so the risk of the front sheet being torn is substantially eliminated.

If it is desired for any reason to be able to bring the carriage into an operative position intermediate between those determined by the engagement of the latch 61 with the slots 62 and 63, a further slot may be provided in the rail 7.

If it is desired to space more than one sheet differentially, e. g., to move the sheet 33 of Figures 1 to 8 through a distance different from that through which the sheet 34 moves while leaving the sheet 22 stationary, a second slide such as 39 may be provided above the first to engage the sheet 33 and to move within predetermined limits. The two slides may be actuated in succession or simultaneously, and a typewriter or the like equipped with them may be regarded as including two differential line-spacing mechanisms according to the invention.

Figures 9 to 12 show a mechanism suitable for attachment to a typewriter having merely a standard travelling carriage without any second carriage, this mechanism being particularly adapted for the typing of checks or receipts with the simultaneous production of a closely spaced record of the matter typed on the checks or receipts. The mechanism is carried by a frame composed of main side members 110, shaped to fit on to existing parts of a standard typewriter and for this purpose formed with slots 160 and 161, transverse back members 111 and 112 and transverse front members 113 and 114. A channel-shaped holder 115 for the front sheet on which the checks or the like are to be typed is carried by the transverse members 111 and 112 and the former of these carries sleeves 116 formed with flanges 117 between which a guide rod 118 extends. The complete assembly of the holder and its supports can slide along the members 111 and 112 into any desired position between the side members 110. The front sheet passes out of the holder 115 between the rod 118 and the member 111 to the platen roller, which is not shown in Figures 9 to 11 but is indicated at 162 in Figure 12. The back sheet and front sheet are gripped between the platen roller and front feed rollers in exactly the same way as in the machine shown in Figures 1 to 8. The front sheet in the example under consideration is printed and perforated to form a number of checks and is shown at 134 in Figures 11 and 12. The back or record sheet is shown at 122 in the same figures.

After passing between the platen roller and front feed rollers the back sheet 122 passes behind the differential line-spacing mechanism and under a bail (not shown) of the kind usual in front-feed typewriters. The front sheet is taken under a bail 177 to the differential line-spacing mechanism. This includes a curved plate 109 carried by bars 108 which extend between two side plates 120 and 121 which are mounted to slide on the transverse members 113 and 114. For the purpose of holding the differential line-spacing mechanism in the desired position along the rods 113 and 114, a plate 163, split at 164, is secured to the side plate 121, and when the split 164 is closed this plate binds frictionally around the rod 114 but when the split 164 is allowed to open the whole mechanism can be moved axially. To close the split a toggle device is provided, this comprising a lever 165 pivotally linked to a lug on the plate 163 and a lever 166 pivotally mounted in the plate 121 and also pivoted to the lever 165 at 167. The pivot 167 is free to move in a slot 168 in the side plate 121. This device is shown in the holding position in Figures 11 and 12 and to release the grip the pivot 167 is moved to the right, as seen in those figures, whereupon the split 164 opens slightly.

A slide 139 is carried by two rearwardly extending brackets 170 which pass through slots 171 in the plate 109 and at the back of the plate 109 are pivotally connected to levers 172 by pivot pins 173, the ends of which slide on the back surface of the plate 109. The levers 172 are also pivotally connected to arms 174 which are rigidly secured to a rod 175 extending between the side plates 120 and 121 and urged about its own axis by a spring 176. This spring tends always to rock the rod 175 counterclockwise as seen in Figures 11 and 12 and accordingly always urges the slide 139 up the front face of the plate 109. The lowermost position of the slide is determined by engagement of the lower edges of the arms 174 with the upper surface of the transverse member 113. The upper limit of the movement of the slide 139 is determined by engagement of the arms 174 with abutments. Since the differential spacing required will of course depend upon the depth of the checks which are being typed, provision is made for varying the upper position of the slide. For this purpose a rod 180 extending between and mounted to rock in the side plates 120 and 121 is provided with two sets of abutments constituted respectively by set screws 181 and 182. At the end of the rod 180 which projects through the side plate 121, a crank lever 183 with a knob 184 is fixed to the rod 180. The knob is of the spring-pressed plunger type and it has a plunger part which can enter either of two holes 185 and 186 in the side plate 121. When the rod 180 is in the position determined by the engagement of the plunger of the knob 184 with the hole 185, the set screws 182 form abutments for set screws 187 carried by the arms 174 so that the limit of movement of the arms 174, and therefore the upper position of the slide 139, is that indicated in chain lines in Figure 11. If the crank 183 is rocked so that the plunger part of the knob 184 engages in the hole 186, the set screws 182 become inoperative and the set screws 181, which are axially offset from the screws 182, are brought into positions in which they constitute abutments for the arms 174 as shown in Figure 12. In this position of the rod 180 the slide 139 has a longer stroke than in the other position of the rod.

The slide 139 carries means for resiliently clamping the front sheet 134, which are identical in principle with the equivalent means in the machine shown in Figures 1 to 8, and include projections 149 extending radially from a spindle 150 carried in the brackets 151, the spindle being urged to turn about its axis by coil springs 152 and carrying an abutment 153. The abutment is rocked by a finger piece 154 fixed to a rod 155 mounted to rotate about its own axis in brackets 156 against a spring 157 towards a fixed finger piece 158 which is carried by a rod 159.

Naturally the differential line-spacing mechanisms may extend over the whole length of the machine if desired, the holder 115 being then made of appropriate length.

I claim:

1. The combination of a travelling carriage having a platen and a deflector plate for guiding a first sheet about said platen, a second carriage mounted on and movable along said first carriage between an inoperative position and at least one operative position, a second deflector plate on said second carriage for guiding a second sheet about said first-mentioned deflector plate, said first sheet and platen, a feed roller on the first carriage movable between operative and inoperative positions for cooperation with said platen in feeding said first sheet and said second sheet in the operative position of said second carriage, and means on said second carriage for engaging and independently feeding said second sheet relative to said first sheet when said feed roller is moved to inoperative position.

2. The combination of a travelling carriage having a platen and a feed roller for movement between an inoperative and an operative sheet feeding position relative to said platen, a second carriage mounted on and movable along said first carriage between an inoperative position and at least one operative position, sheet supporting means for supporting and guiding a first sheet about said platen, sheet supporting means for a second sheet movable with said second carriage for supporting and guiding a second sheet over said first sheet about said platen, said feed roller cooperating to hold both of said sheets in feeding cooperation with the platen in the operative position of said second carriage, and independent sheet feeding means on said second carriage for gripping and feeding said second sheet relative to and independently of said platen and first sheet when said feed roller is moved to inoperative position.

3. The combination of a travelling carriage having a platen and a feed roller for movement between an inoperative and an operative sheet feeding position relative to said platen, a second carriage mounted on and movable along said first carriage between an inoperative position and at least one operative position, a tray supporting a first sheet movable with said first carriage, guiding means for guiding said first sheet from said tray to and about said platen, a second tray supporting a second sheet movable with said second carriage, and guiding means for guiding said second sheet from said tray about said first sheet and platen, said feed roller holding both of said sheets in operative feeding relation with the platen in the operative position of said feed roller and the second carriage.

4. The combination of a travelling carriage having a platen and a feed roller for movement between an inoperative and an operative sheet feeding position relative to said platen, a second carriage mounted on and movable along said first carriage between an inoperative position and at least one operative position, a tray supporting a first sheet movable with said first carriage, guiding means for guiding said first sheet from said tray to and about said platen, a second tray supporting a second sheet movable with said second carriage, guiding means for guiding said second sheet from said tray about said first sheet and platen, said feed roller holding both of said sheets in operative feeding relation with the platen in the operative position of said feed roller and the second carriage, and a sheet feeding device on said second carriage for gripping and feeding said second sheet independently of said first sheet when said feed roller is moved to inoperative position.

5. The combination of a travelling carriage having a platen and a feed roller for movement between an inoperative and an operative sheet feeding position relative to said platen, a second carriage mounted on and movable along said first carriage between an inoperative position and at least one operative position, a tray supporting a first sheet movable with said first carriage, a deflector plate on the first carriage for guiding said first sheet about said platen, a second tray supporting a second sheet movable with said second carriage, a second deflector plate on said second carriage for guiding said second sheet about said first deflector plate and said platen, said second sheet lying in superimposed relation on said first sheet in the operative position of said second carriage and being held in feeding cooperation about said platen with the first sheet by said feed roller in the operative position thereof, and means on said second carriage for differentially feeding said second sheet thereon and relative to said first sheet when said feed roller is moved to inoperative position.

6. The combination of a travelling carriage, a second carriage mounted on and movable along said first carriage between an inoperative position and at least one operative position, said second carriage comprising a pair of spaced plates hingedly connected at one end for movement of one plate into an open position relative to the other, roller means on one plate mounting said second carriage for said movement on said first carriage, latching means for securing the free ends of said plates together in said parallel relation, a slide plate movably mounted on the other plate for movement in a transverse direction to the movement of said carriages, means for moving said slide plate, and paper clamping means on said slide plate for clamping a sheet thereto for feeding by said slide plate transversely relative to said first carriage.

7. The combination of a travelling carriage, a second carriage mounted on and movable along said first carriage between an inoperative position and at least one operative position, said second carriage having a pair of spaced plates detachably secured together in spaced parallel relation, one of said plates having means movably mounting said second carriage on said first carriage, means on one of said plates for clamping a paper sheet therebetween, and paper feeding means on the other of said plates for engaging and feeding another sheet in a transverse direction relative to the direction of movement of said carriages.

8. The combination of a travelling carriage, a second carriage mounted on and movable along said first carriage between an inoperative position and at least one operative position, said second carriage having a pair of spaced plates detachably secured together in spaced parallel relation, one of said plates having means movably mounting said second carriage on said first carriage, a slide plate mounted on the other of said plates for movement thereon transversely to the direction of carriage movement, and paper clamping means on said slide plate for clamping a sheet thereto for movement therewith.

9. The combination of a travelling carriage, a second carriage mounted on and movable along said first carriage between an inoperative position and at least one operative position, said second carriage having a pair of spaced plates detachably secured together in spaced parallel relation, one of said plates having means movably mounting said second carriage on said first carriage, a slide plate mounted on the other of said plates for movement transversely to the direction of carriage movement, paper clamping means on said slide plate, and resilient means for normally moving said slide plate in a direction to feed a sheet clamped thereto.

10. The combination of a travelling carriage, a second carriage mounted on and movable along said first carriage between an inoperative position and at least one operative position, said second carriage having a pair of spaced plates detachably secured together in spaced parallel relation, one of said plates having means movably mounting said second carriage on said first carriage, a slide plate mounted on the other of said plates for movement transversely to the direction of carriage movement, paper clamping means on said slide plate, resilient means for normally moving said slide plate in a direction to feed a sheet clamped thereto, and cooperating means on said slide plate and the other of said pair of plates for limiting the sheet feeding movement of said slide plate.

11. The combination of a travelling carriage, a second carriage mounted on and movable along said first carriage having a sheet supporting and guiding plate, a sheet gripping and feeding means movable along said plate for feeding a sheet thereover transversely to the direction of carriage movement, and means for supporting and moving said sheet gripping and feeding means on said plate.

PERCY WILLIAM WOODGATE.

REFERENCES CITED

The following references are of record in the file of this patent:

UNITED STATES PATENTS

| Number | Name | Date |
| --- | --- | --- |
| 2,047,428 | Pfeiffer | July 14, 1936 |
| 979,671 | Hopkins | Dec. 27, 1910 |
| 1,597,769 | Crews | Aug. 31, 1926 |
| 1,212,940 | Hart | Jan. 16, 1917 |
| 1,214,688 | Kurowski | Feb. 6, 1917 |
| 1,216,251 | Brown | Feb. 13, 1917 |
| 1,608,871 | Waldheim | Nov. 30, 1926 |